S. TOUSEY.
DEVICE FOR AIMING FIREARMS.
APPLICATION FILED MAY 22, 1917.
1,340,579.         Patented May 18, 1920.
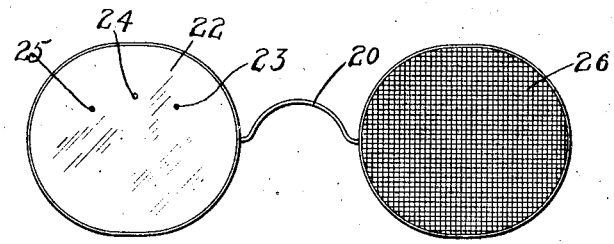
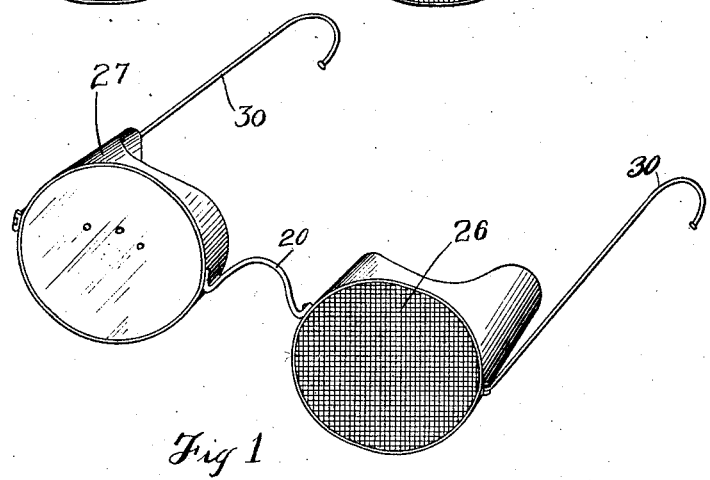
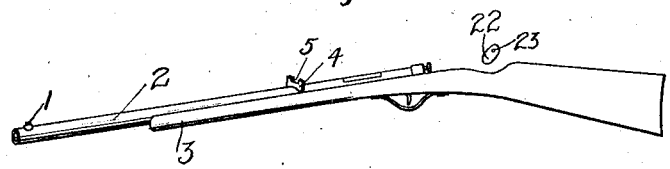
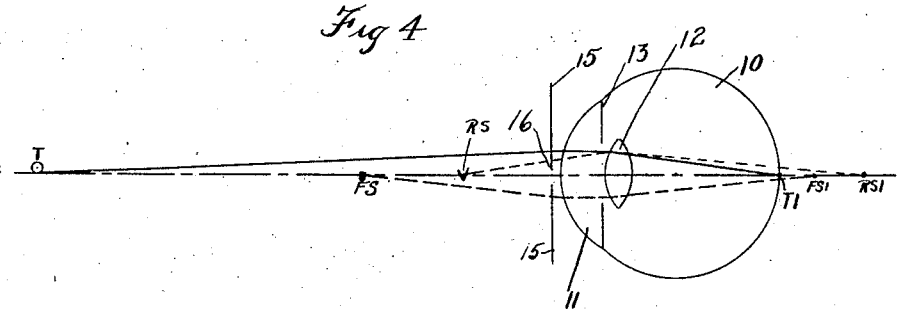
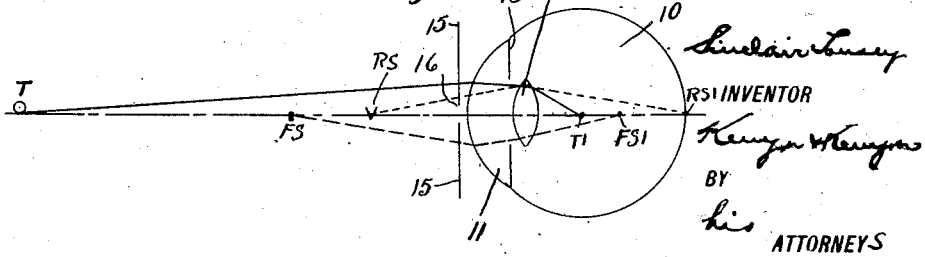

UNITED STATES PATENT OFFICE.

SINCLAIR TOUSEY, OF NEW YORK, N. Y.

DEVICE FOR AIMING FIREARMS.

1,340,579.  Specification of Letters Patent.  Patented May 18, 1920.

Application filed May 22, 1917. Serial No. 170,156.

*To all whom it may concern:*

Be it known that I, SINCLAIR TOUSEY, a citizen of the United States, and a resident of the city, county, and State of New York, have invented certain new and useful Improvements in Devices for Aiming Firearms, of which the following is a specification.

My invention relates to apparatus for use in aiming fire-arms and includes means wherein sights used in directing or aiming the fire-arm appear clear and distinct when the eye of the person aiming the fire-arm is focused upon the target.

In using the sights ordinarily employed in connection with fire-arms, considerable difficulty is experienced in attempting to bring the sights accurately into proper relative position, by reason of the fact that the human eye, when accommodated for objects at a distance, (in this case, the target) is incapable of receiving upon its retina a sharply defined image of objects nearby (in this case, the sights on the fire-arm). If the eye is accommodated for one of the sights, the image of the other is blurred and the target, which is ordinarily at a distance from the eye many hundreds of times greater than the distance of the sight from the eye, forms practically no image on the retina which can be identified.

The universal practice in the attainment of the best marksmanship is to focus the eye upon the target and then to bring the sights into line, thereby directing the barrel of the fire-arm at the target. The sights will be so blurred that they cannot be accurately positioned relatively to one another and to the line of sight to the target, and the object of my invention is to provide simple means for assisting and enabling the eye to form a sharp image of the sights even though the eye be accommodated and focused upon the target. This will permit accurate relative positioning of the sights even though the marksman continually observes the target.

Other objects and advantages will appear in the following description, taken with the accompanying drawings, forming a part of this specification, and will be pointed out in the hereunto appended claims.

In the drawings in which like reference characters indicate similar parts,

Figure 1 illustrates a means for aiming fire-arms which embodies my invention;

Fig. 2 is a detail view showing in detail an element of the above-mentioned means;

Fig. 3 is a perspective view of the construction shown in Fig. 2; and

Figs. 4 and 5 are diagrams showing the relation of light rays in aiming fire-arms by the use of ordinary sights.

One of the best known devices for aiming a fire-arm consists in two sights, namely, a front sight, such as that shown at 1 in Fig. 1, which is placed near the end of the barrel 2 of the fire-arm 3, and a rear sight 4. The rear sight is placed near the rear end of the barrel 2 and ordinarily consists in a piece of metal having a notch 5, through which the front sight 1 is viewed in aiming.

When front and rear sights of this type are used, and the eye is focused upon the target T, appearing in Fig. 4, then the light rays coming from the target T will be properly focused upon the retina of the eye at T I. The eye-ball, it will be understood, is indicated at 10, and includes the cornea 11, the lens 12 and the iris 13, whereby the aperture in front of the lens is enlarged and decreased according to the strength of light observed.

The light rays coming from the front sight F S in Fig. 4 will be brought to a focus at a point beyond the retina at F S I, and the light rays coming from the rear sight, R S of Fig. 4, will be brought together at a point still farther beyond the retina at R S I. If the eye is focused upon or accommodated to the rear sight R S in Fig. 5, then the image of the rear sight will be formed in its proper place upon the retina of the eye at R S I, but the rays coming from the front sight will converge at a point in front of the retina at F S I, and the rays coming from the target will converge at a point still farther in front of the retina and will strike the retina, as shown in Fig. 5, giving a greatly blurred vision, just as the separated rays shown in Fig. 4 give a blurred vision.

By means of my invention the user is given at the same time a distinctness of vision of the distant target and the near by sights not possible without such means. It accomplishes this by cutting off the diffused, divergent and scattered rays of light, and by allowing only a direct ray or rays to enter the aperture to which the eye is placed. It is evident, therefore, that as the rays which cause blurring of the sight are thus excluded, greater accuracy of aim is sure to result from the use of the device.

It will be seen that by placing in front of the eye a screen 15, having a small aperture 16, the screen will exclude all of the rays which enter the eye and reach the lens and are thrown upon the retina far from the point at which the rays converge, which come from the object upon which the eye is focused. The aperture 16 gives the eye a universal focus. In order to take advantage of this phenomenon and combine, with the ordinary type of sights, means for giving the eye a universal focus, I provide the device illustrated in detail in Figs. 2 and 3. A frame 20 is provided for holding two screens in front of the eyes. If sighting is to be with the right eye, then the right-hand screen 22 may be made of opaque material, such as metal or hard rubber, or it may be made of glass which has been rendered opaque or frosted or roughened, but in any case, I intend that there will be provided three apertures 23, 24 and 25, which are preferably in the neighborhood of 8/100ths of an inch in diameter, and through which the passage of light is unobstructed, except that there may be placed before these apertures a lens ground to correct any weaknesses of the user's eye. These apertures are small enough to give the eye a universal focus, sufficiently sharp to produce a practically clear image of the sights and the target simultaneously, but the apertures are large enough to permit a sufficient quantity of light to enter the eye to make the image of the target clear. The apertures are far enough apart so that only one of them may be looked through at one time—that is, the distance between them is preferably greater than the diameter of the pupil of the eye under the conditions existing at the time the aiming takes place.

If the user of my aiming means is firing a rifle then the aperture nearest the nose indicated at 23 will be the one which is brought into use. If a large gun or a machine gun is being aimed, the aperture 24 will come into use, as the sights of such a gun are ordinarily directly in front of the observer. If the person aiming is using a revolver, the aperture 25 will come into use, as in aiming a revolver a person ordinarily looks along a line passing near the shoulder.

It is well known that if light is excluded from one eye and marked changes are made in the intensity of the light reaching the other eye, the iris of the covered eye will nevertheless expand and contract. Therefore, in order to prevent such an effect upon the eye behind the screen 22, a screen 26 is placed before the other eye, which is foraminated and through which a decreased amount of light is permitted to pass, or smoked or colored glass, or a removable insert, may be used to achieve the same end. This will make the light condition affecting both eyes more nearly uniform. In order to exclude all light so as to render effective the light screens 22 and 26, I provide curtains 27 which fit the contour of the face and exclude all light except that coming through the screens. The screens containing the apertures 23, 24 and 25 are ordinarily made of very thin material so that it will make very little difference whether the light rays pass through in a direction perpendicular to the screen 22. The apertures may be made of any shape to compensate for any obliquity of the screen to the line of the sight. It is very important that the apertures be the proper size and the two considerations governing the size are, first, that sufficient light will come through the aperture to give a clear image of the target on the retina, and, second, that the aperture will be small enough to give universal focus to the eye. While I have shown only three apertures in the screen 22, it is evident, of course, that as many more as desired may be made therein, so long as the considerations governing the placing of the same heretofore explained are taken into account. If it is desirable, and one is capable of supporting a monocle by the use of the muscles surrounding the eye, my invention can be practised with a monocle, comprising a screen having the proper apertures in it.

It will be seen that means for aiming a firearm embodying my invention includes the front sight 1, the rear sight 4, the sights being mounted rigidly relatively to the barrel 2, and the screen 22, wherein there is formed an aperture 23, the screen being preferably provided with means, such as the temple bars 30, for supporting it relatively to and near the eye of the observer.

I do not intend that my invention shall be limited to the details of the construction described herein for the purpose of disclosing and interpreting it, but intend that it shall be defined by the hereunto appended claims.

Having described my invention, what I claim as new and desire to secure by Letters Patent is:

1. In apparatus for aiming a fire-arm, a shield for the sighting eye of the observer, said shield having a plurality of apertures of sufficient size to permit the formation of a clear image of the target and small enough to prevent substantial blurring of the sights of the fire-arm, said apertures being positioned respectively in the usual line of vision in aiming a rifle, a cannon and a revolver.

2. In apparatus for aiming a fire-arm, a fixedly mounted shield for the sighting eye of the observer, said shield having apertures therein of sufficient size to permit the formation of a clear image of the target and small enough to prevent substantial blurring of the sights of the fire-arm, said apertures being in the region of the shield through which the line of vision passes according to whether the observer is aiming a rifle, machine gun or revolver and spaced from any other aperture a distance greater than the diameter of the pupil of the observer's eye.

3. In apparatus for aiming a fire-arm, a shield for the sighting eye of the observer, said shield having apertures therein of sufficient size to permit the formation of a clear image of the target and small enough to prevent substantial blurring of the sights of the fire-arm, said apertures being in the region of the shield through which the line of vision passes according to whether the observer is aiming a rifle, machine gun or revolver and spaced from any other aperture a distance greater than the diameter of the pupil of the observer's eye, and means for excluding from the eye substantially all light except that entering through said shield.

4. In apparatus for aiming a fire-arm, a shield for the sighting eye of the observer, said shield having apertures therein of sufficient size to permit the formation of a clear image of the target and small enough to prevent substantial blurring of the sights of the fire-arm, said apertures being in the region of the shield through which the line of vision passes according to whether the observer is aiming a rifle, machine gun or revolver and spaced from any other aperture a distance greater than the diameter of the pupil of the observer's eye, means for excluding from the sighting eye substantially all light except that entering through said shield, and means for reducing the light reaching the other eye, substantially as set forth.

In testimony whereof I have signed my name to this specification.

SINCLAIR TOUSEY.